(12) United States Patent
Sasaki et al.

(10) Patent No.: US 11,385,626 B2
(45) Date of Patent: Jul. 12, 2022

(54) PRODUCTION PLANNING APPARATUS

(71) Applicant: FANUC CORPORATION, Yamanashi (JP)

(72) Inventors: Masaaki Sasaki, Yamanashi (JP); Kazuhisa Otsuka, Yamanashi (JP); Toshimichi Yoshinaga, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 307 days.

(21) Appl. No.: 16/697,185

(22) Filed: Nov. 27, 2019

(65) Prior Publication Data
US 2020/0174459 A1 Jun. 4, 2020

(30) Foreign Application Priority Data

Dec. 3, 2018 (JP) .............................. JP2018-226837

(51) Int. Cl.
*G05B 19/418* (2006.01)
*G06Q 10/06* (2012.01)

(52) U.S. Cl.
CPC ... *G05B 19/41865* (2013.01); *G05B 19/4185* (2013.01); *G06Q 10/06311* (2013.01)

(58) Field of Classification Search
CPC .......... G05B 19/41865; G05B 19/4185; G05B 2219/32277; G05B 19/41895; G05B 2219/31088; G06Q 10/06311; Y02P 90/02; Y02P 90/60
See application file for complete search history.

(56) References Cited

U.S. PATENT DOCUMENTS

| 2007/0233362 | A1* | 10/2007 | Carriker | G06Q 10/047 |
| | | | | 701/532 |
| 2015/0081077 | A1* | 3/2015 | Li | G05B 19/41865 |
| | | | | 700/100 |
| 2021/0232998 | A1* | 7/2021 | Takazaki | G06Q 10/06393 |

FOREIGN PATENT DOCUMENTS

| JP | 2003197711 A | 7/2003 |
| JP | 200640125 A | 2/2006 |
| JP | 4138541 B2 * | 8/2008 |
| JP | 201549819 A | 3/2015 |

(Continued)

OTHER PUBLICATIONS

Doo Yong Lee and F. DiCesare, "Integrated scheduling of flexible manufacturing systems employing automated guided vehicles," in IEEE Transactions on Industrial Electronics, vol. 41, No. 6, pp. 602-610, Dec. 1994, doi: 10.1109/41.334577 (Year: 1994).*

(Continued)

*Primary Examiner* — Christopher E. Everett
(74) *Attorney, Agent, or Firm* — Hauptman Ham, LLP

(57) ABSTRACT

The production planning apparatus includes a memory configured to store, with respect to each of a plurality of process steps included in a production process for producing predetermined articles, the number of resources for setup step that are available for a setup step in which setup for performing work of the process step is performed and a processor configured to determine, on the basis of the number of the resources for setup step, among the resources for setup step, resources that are allocated to the setup steps of respective ones of the plurality of process steps in such a way that a total of required times required for the setup steps of respective ones of the plurality of process steps is minimized.

7 Claims, 5 Drawing Sheets

(56) References Cited

FOREIGN PATENT DOCUMENTS

JP 201772927 A 4/2017
JP 2017-162044 A 9/2017

OTHER PUBLICATIONS

Fazlollahtabar, H., Saidi-Mehrabad, M. Methodologies to Optimize Automated Guided Vehicle Scheduling and Routing Problems: A Review Study. J Intell Robot Syst 77, 525-545 (2015). https://doi.org/10.1007/s10846-013-0003-8 (Year: 2015).*

* cited by examiner

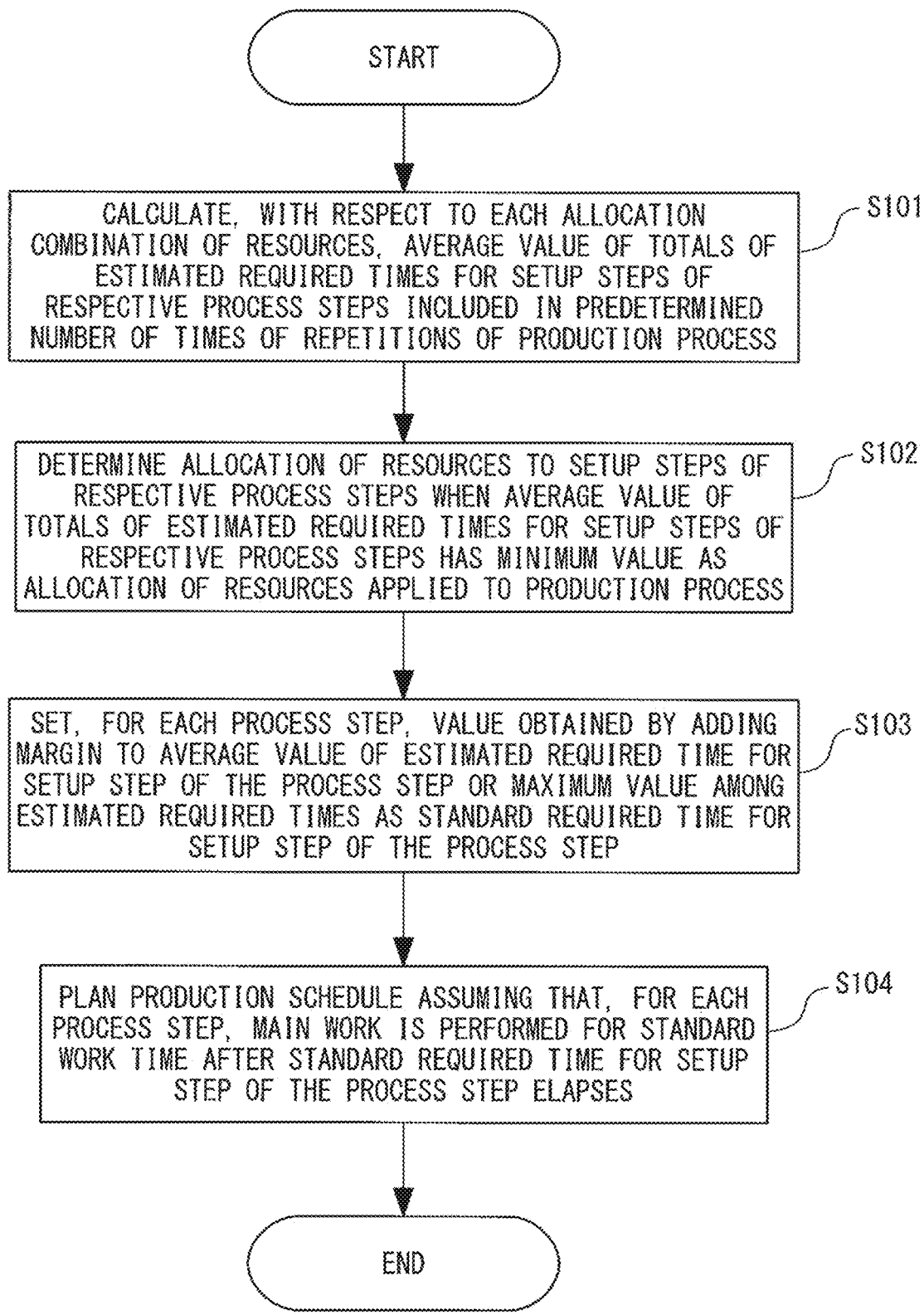

PRODUCTION PLANNING APPARATUS

RELATED APPLICATIONS

The present application claims priority of Japanese Application Number 2018-226837, filed Dec. 3, 2018, the disclosure of which is hereby incorporated by reference herein in its entirety.

FIELD

The present invention relates to, for example, a production planning apparatus.

BACKGROUND

In order to operate production facilities efficiently, it is necessary to appropriately make a production plan that prescribes times required for respective process steps in which individual work included in a production process for producing articles is performed, types and the numbers of various pieces of equipment that production facilities include, and the like. Accordingly, a technique for calculating a degree of divergence between standard times and actual work times of respective process steps relating to production, analyzing a degree of influence of the calculated degree of divergence on a plurality of production KPIs, which are indices relating to the production, and, on the basis of the standard times and distributions of the actual work times of the respective process steps, calculating recommended values of set values of master data that simultaneously optimize the plurality of production KPIs has been proposed (see, for example, Japanese Unexamined Patent Publication (Kokai) No. 2017-162044).

SUMMARY

In order to perform work of each process step, it is necessary that not only a workpiece to be worked on in the process step but also parts, materials, or tools that are used for processing the workpiece are present at a place where the work of the process step is performed before the process step is started. In addition, in some cases, it is necessary that, before completion of each process step, an apparatus for transport for transporting a workpiece from a place where work of the process step is performed to a place where work of the next process step is to be performed is positioned at the work place for the process step. Therefore, in order to perform work of the respective process steps efficiently, it is necessary to also take into consideration sufficiently a step of performing setup (hereinafter, referred to as a setup step) for performing work of the process step. In a setup step, transport of articles, such as a workpiece to be worked on, a part other than the workpiece, a material, and a tool, is performed. However, setup steps are not taken into consideration sufficiently in the above-described technologies, and there has been a possibility that, even when production facilities are operated in accordance with a production plan made based on the above-described technologies, a necessary article is not present at the work place of some process step at the time of work start or work completion of the process step, resulting in a delay in the work of the process step.

In one aspect, an object is to provide a production planning apparatus capable of optimizing resources allocated to setup steps of respective process steps included in a production process.

According to an embodiment, a production planning apparatus is provided. The production planning apparatus includes: a memory configured to store, with respect to each of a plurality of process steps included in a production process for producing predetermined articles, the number of resources for setup step that are available for a setup step in which setup for performing work of the process step is performed; and a processor configured to determine, on the basis of the number of the resources for setup step, among the resources for setup step, resources that are allocated to the setup steps of respective ones of the plurality of process steps in such a way that a total of required times required for the setup steps of respective ones of the plurality of process steps is minimized.

According to one aspect of the present invention, it is possible to optimize resources allocated to setup steps of respective process steps included in a production process.

BRIEF DESCRIPTION OF DRAWINGS

FIG. 5 is an operation flowchart of production planning processing.

DESCRIPTION OF EMBODIMENTS

Hereinafter, with reference to the drawings, a production planning apparatus will be described. The production planning apparatus reduces waiting times during which work is unable to be performed in respective process steps, by allocating resources to setup steps of respective process steps in such a way as to minimize the total of required times for the setup steps of the respective process steps, on the basis of the number of resources available for each of the setup steps of the respective process steps, times required for transport of workpieces between work places of the respective process steps, and the like and thereby achieves optimization of a production schedule.

Figure 1:
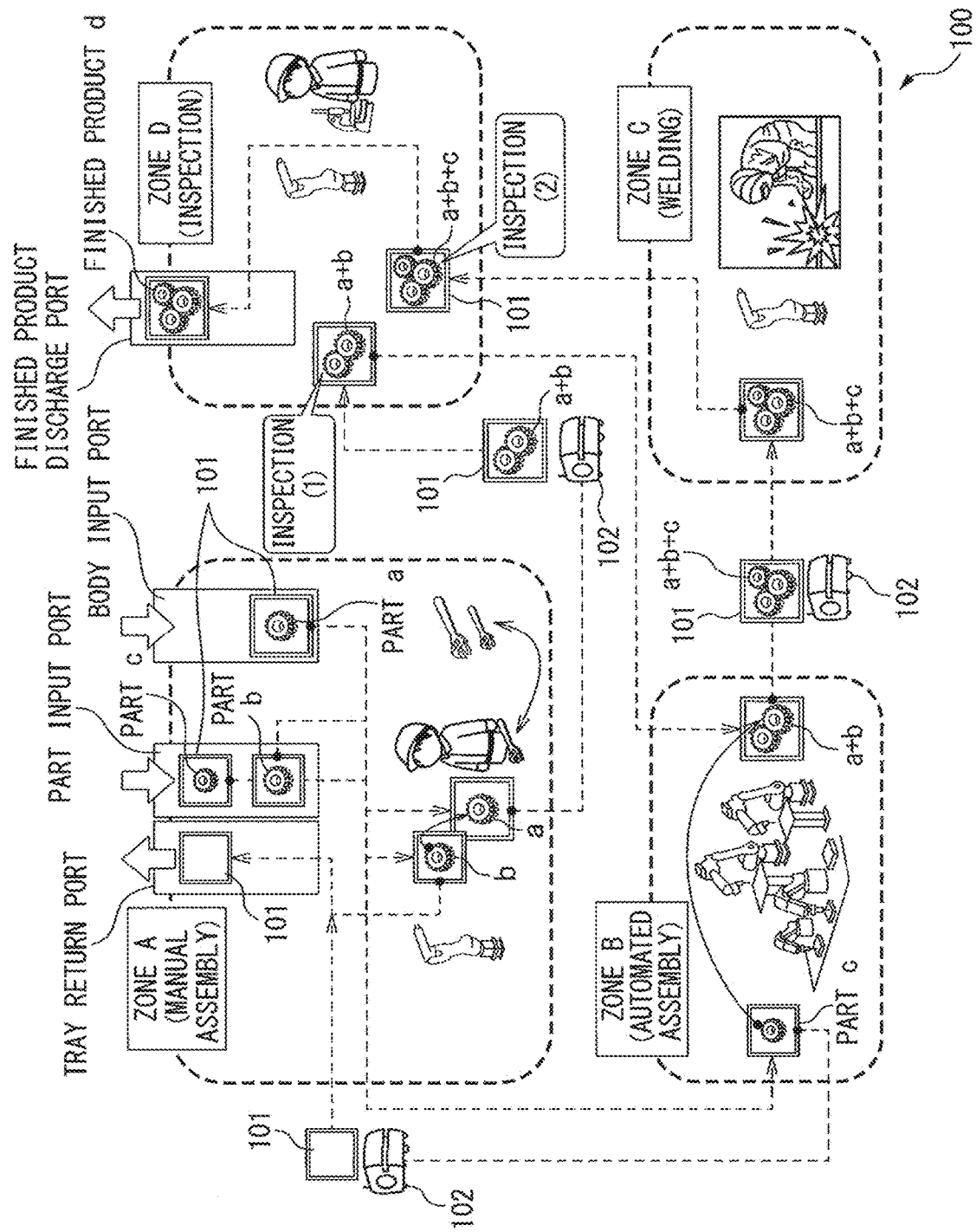
FIG. 1 is a diagram illustrating an example of production facilities that serve as a target for which a production schedule is planned.

FIG. 1 is a diagram illustrating an example of production facilities that serve as a target for which a production schedule is planned. Production facilities 100 illustrated in FIG. 1 are so-called job-shop type production facilities, are grouped with respect to each process step having functions of the same type, and are arranged with respect to each group. In the example, four types of process steps are respectively performed in zones A to D. In other words, each zone is an example of a work place for any of the process steps included in a production process. In the zone A, a manual assembly step in which a part is assembled to a workpiece body through manual work by an assembly worker is performed. In the zone B, an automated assembly step in which a part is assembled to a workpiece body through automated work by a robot is performed. In the zone C, a welding step in which welding work on a workpiece body is performed by a welding robot or a welding worker is performed. In the zone D, an inspection step in which a workpiece body and the like are inspected by an inspection worker by use of an instrument for inspection is performed.

In addition, each part or a workpiece body is mounted on a tray 101 and is transported. Further, as resources for transport of a workpiece body or each part among the respective zones, a plurality of automated guided vehicles (AGVs) 102 are used. The AGVs 102 are an example of resources for setup steps.

In the production process in the example, a finished product d is produced from three parts a, b, and c by use of the production facilities 100. Specifically, first, the part a that serves as a workpiece body is input into the zone A through a body input port, and the parts b and c are input into the zone A through a part input port. Each part is mounted on a tray 101 and is input. By the manual assembly step, the part b is assembled to the part a. Subsequently, a tray 101 on which the part b had been mounted is returned through a tray return port. In addition, the workpiece body (an assembly in which the part b is assembled to the part a) is mounted on a tray 101 and is transported from the zone A to the zone D by an AGV 102. When it is confirmed that the workpiece body is normal by a first inspection step, the workpiece body is once again mounted on the tray 101 and is transported from the zone D to the zone B by an AGV 102. Note that, when some abnormality (for example, a defect in assembly or a defect in either the part a or b) is detected in the workpiece body in the first inspection step, the workpiece body may be mounted on the tray 101 and be returned from the zone D to the zone A by an AGV 102 or a worker.

In addition, the part c is also mounted on a tray 101 and is transported from the zone A to the zone B by an AGV 102. In the zone B, by the automated assembly step, the part c is assembled to the workpiece body, which passed through the first inspection step. A tray 101 that is emptied because of the assembly of the part c (i.e., a tray that was used to transport the part c) is transported to the tray return port, which exists in the zone A, by an AGV 102 and the emptied tray 101 is returned through the tray return port.

The workpiece body (an assembly in which the parts b and c are assembled to the part a) is mounted on a tray 101 and is transported from the zone B to the zone C by an AGV 102. In the zone C, the respective parts a, b, and c included in the workpiece body are welded to one another by the welding step. The welded workpiece body is mounted on a tray 101 and is transported from the zone C to the zone D by an AGV 102. When it is confirmed that the workpiece body is normal by a second inspection step, the workpiece body is mounted on the tray 101 and is moved out through a finished product discharge port.

Figure 2:
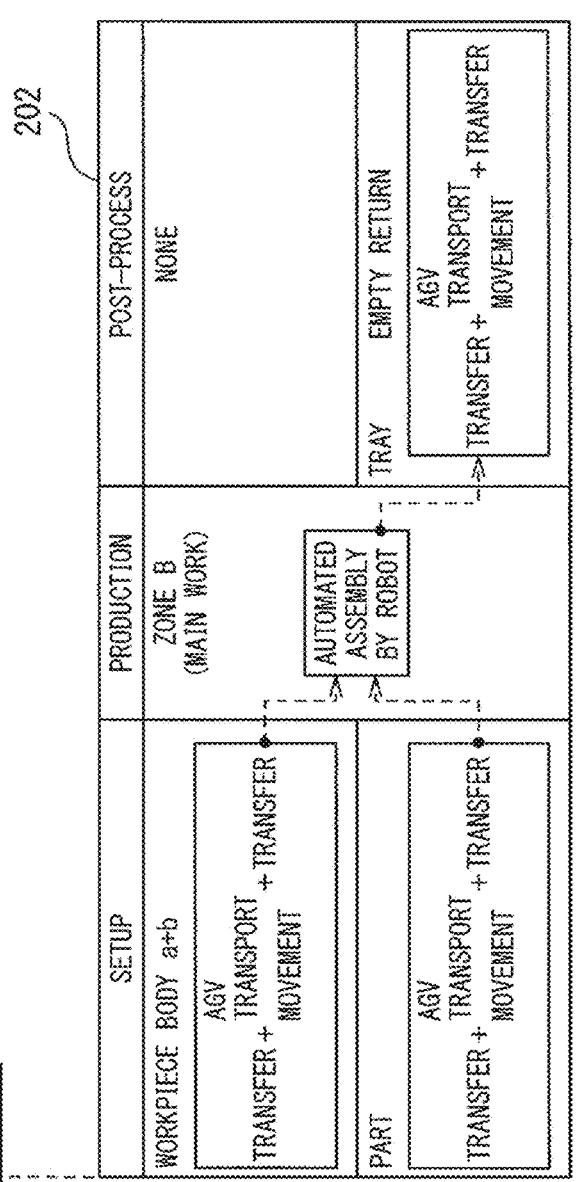
FIG. 2 is an explanatory diagram of outline of a production schedule that includes setup steps of respective process steps.

FIG. 2 is an explanatory diagram of outline of a production schedule that includes setup steps of respective process steps. FIG. 2 is, as an example, illustrated with respect to a schedule 201 of the first inspection step and a schedule 202 of the automated assembly step. As illustrated in FIG. 2, as a setup step for performing the first inspection step, transport of a workpiece body (an assembly of the parts a and b) from the zone A to the zone D by an AGV 102 is performed. The transport includes transfer of a workpiece body from a work place to an AGV 102 in the zone A, movement of the AGV 102 from the zone A to the zone D, and transfer of the workpiece body from the AGV 102 to a work place in the zone D. When the inspection in the zone D is finished, transport of the workpiece body from the zone D to the zone B by an AGV 102 and, in conjunction therewith, transport of the part c from the zone A to the zone B by another AGV 102 are performed as a setup step for performing the automated assembly step. In this case, it is preferable that scheduling be made in such a way that the part c arrives at the zone B before the workpiece body arrives at the zone B. In addition, in the automated assembly step, a post-process step in which another AGV 102 transports an emptied tray from the zone B to the zone A is also performed after the automated assembly. Note that a post-process step is also an example of a setup step.

As described above, in the production facilities 100, AGVs 102 are used for transport of a workpiece body or each part. Thus, in order to enable work of the respective process steps included in a production process to be performed efficiently, the production planning apparatus according to the present embodiment optimizes, with respect to each process step, a required time for the setup step of the process step (in the example, a time required for setup performed after work of the previous process step has been finished until work of the process step becomes ready to start, for example, a time required for transport of a workpiece body etc., from a zone where the previous process step is performed to a zone where the process step is performed) and the number of AGVs 102 allocated to the setup step of the process step by taking into consideration the number of available AGVs 102 and times required for transport of workpiece bodies, parts, etc., among the respective zones.

Figure 3:
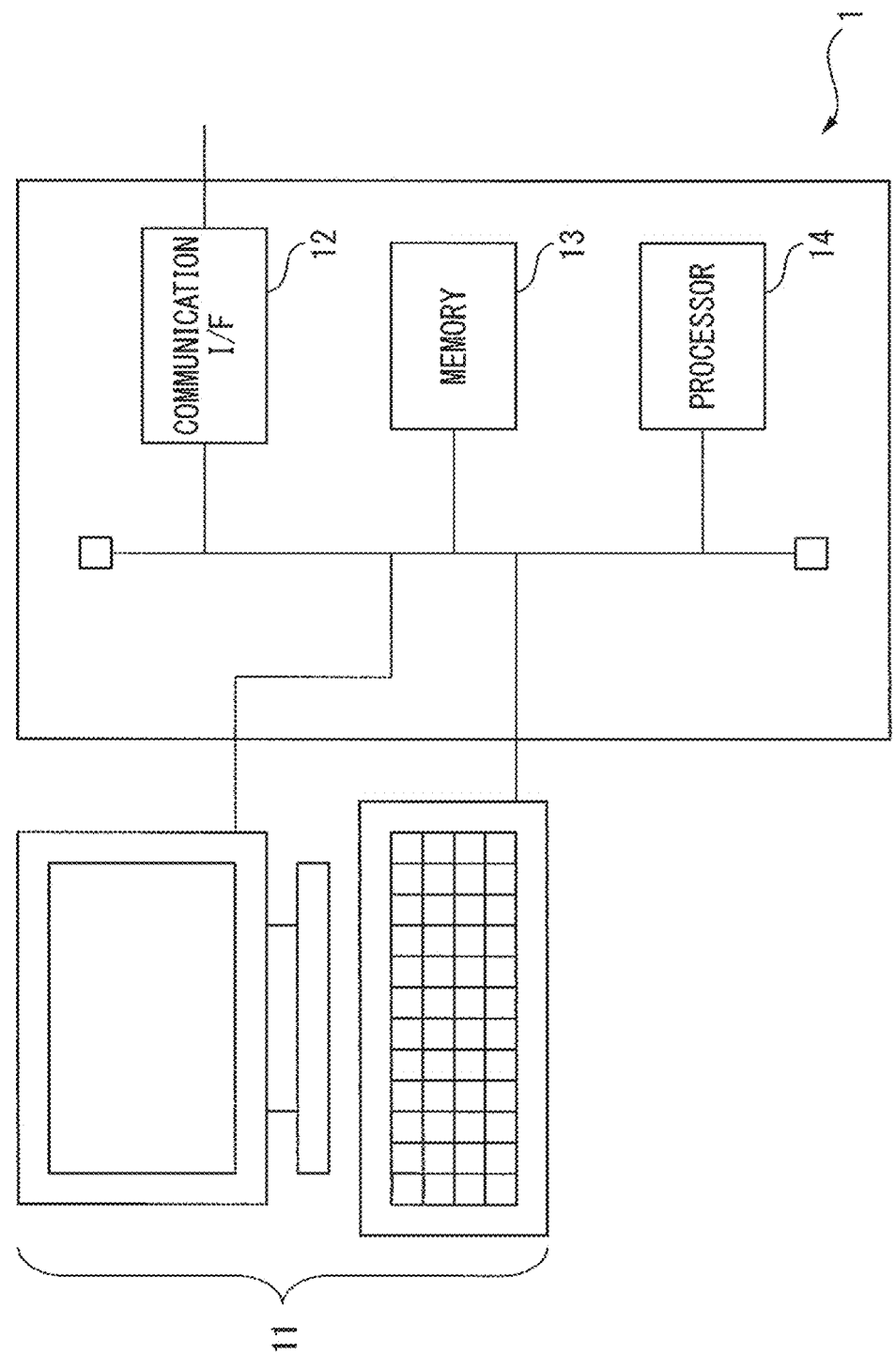
FIG. 3 is a schematic configuration diagram of a production planning apparatus.

FIG. 3 is a schematic configuration diagram of the production planning apparatus. A production planning apparatus 1 includes a user interface 11, a communication interface 12, a memory 13, and a processor 14.

The user interface 11 is an example of a notification unit and, for example, separately includes an input device, such as a keyboard and a mouse for operation signal input, and a display device, such as a liquid crystal display. Alternatively, the user interface 11 may include a device, such as a touch panel, into which an input device and a display device are integrated. Further, the user interface 11 may include a speaker. The user interface 11 generates an operation signal representing an operation performed by a user, for example, a signal representing various types of information used in production planning processing (for example, standard values of required times (hereinafter, referred to as standard work times) required for work of respective process steps except setup steps thereof (hereinafter, referred to as main work), types and the number of resources available for the setup steps of the respective process steps, and the like) and outputs the operation signal to the processor 14. In addition, the user interface 11 displays a planned production schedule in accordance with a signal for display received from the processor 14.

The communication interface 12 is an example of a communication unit and includes, for example, a communication interface for connecting the production planning apparatus 1 to control apparatuses (for example, programmable logic controllers) of various resources, such as a robot, a machine tool, and AGVs, included in the production facilities 100. The communication interface 12 outputs, for example, a control signal, such as a command commanding start of operation, for each resource, which is received from the processor 14, to the control apparatus of the resource via a communication line. In addition, the communication interface 12 transfers signals, which are received from the respective control apparatuses, that represent states of the various resources or states of the process steps (for example, arrivals and departures of AGVs, completion of process steps, and the like in the respective zones) to the processor 14.

The memory 13 is an example of a storage unit and includes, for example, a readable and writable semiconductor memory and a read-only semiconductor memory. Further, the memory 13 may include a storage medium, such as a semiconductor memory card, a hard disk, and an optical storage medium, and an apparatus for accessing the storage medium.

The memory 13 stores various types of information used in the production planning processing performed by the processor 14 of the production planning apparatus 1, such as types and the number of resources available for the respective process steps and the setup steps of the respective process steps, map information representing an arrangement of the respective zones and movement routes among the zones, times required for transport of workpiece bodies, parts, etc., between the respective zones, i.e., between the work places of the respective ones of two successive process steps, standard work times of the respective process steps, and the number of workpiece bodies that are simultaneously processed in the respective process steps. Note that, as information representing times required for transport of workpiece bodies and the like, movement routes among the zones and an average movement speed of resources for transport, such as AGVs, may be stored. In addition, the memory 13 may store measured values of actual required times with respect to work of the respective process steps. Further, the memory 13 may store a computer program for production planning processing. Furthermore, the memory 13 may store a planned production schedule (including required times for the respective process steps and the respective setup steps, standard work times of the respective process steps and standard required times for the setup steps of the respective process steps, and information on resources allocated to the respective process steps or the setup steps thereof).

The processor 14 is an example of a control unit and includes, for example, a central processing unit (CPU) and its peripheral circuits. Further, the processor 14 may include a processor for logical operations and a processor for numerical operations. The processor 14 controls the whole of production facilities that serves as a target for which a production schedule is planned. In addition, the processor 14 executes the production planning processing and thereby plans a production schedule.

Figure 4:
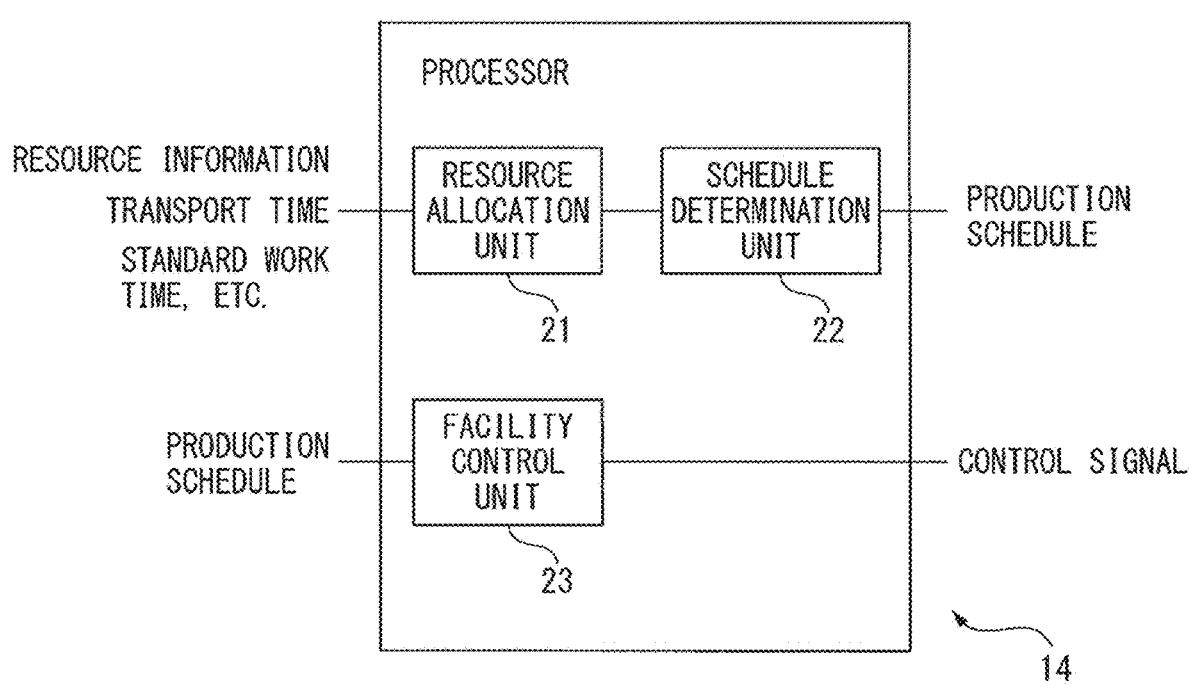
FIG. 4 is a functional block diagram of a processor of the production planning apparatus.

FIG. 4 is a functional block diagram of the processor 14 related to the production planning processing. The processor 14 includes a resource allocation unit 21, a schedule determination unit 22, and a facility control unit 23. Each of the units included in the processor 14 is, for example, a function module achieved by a computer program executed on the processor 14. Alternatively, each of the units may be mounted in the processor 14 so as to serve as a dedicated arithmetic circuit provided in a part of the processor 14.

The resource allocation unit 21 determines an allocation of resources to setup steps of respective process steps included in a production process in such a way that the total of required times for the setup steps of the respective process steps is minimized. For this purpose, the resource allocation unit 21, for example, calculates a total of estimated values of required times for the setup steps of the respective process steps with respect to each performance of a production process when it is assumed that the entire production process is performed for a predetermined number of times and calculates an average value of the totals of estimated values of required times, while an allocation combination of resources to the setup steps of the respective process steps included in the production process is changed into various combinations. The predetermined number of times can be set, for example, as a number of times of repetitions when an arrangement of resources after the production process has been repeated for the number of times is the same as an arrangement of resources when the first round of the production process was started (hereinafter, referred to as an initial arrangement). In addition, the predetermined number of times may differ with respect to each allocation combination of resources. As described above, by using an average value of the totals of estimated values of required times for the setup steps of the respective process steps when a production process has been repeated the predetermined number of times for allocation of resources, the resource allocation unit 21 can accurately estimate required times for the setup steps of the respective process steps even when positions of resources (AGVs 102 in the example in FIG. 1) are different every time each production process is started. Therefore, the resource allocation unit 21 is capable of appropriately allocating resources to the setup steps of the respective process steps.

For example, the resource allocation unit 21 may calculate, with respect to each possible allocation combinations of resources, estimated values of required times for the setup steps of the respective process steps for each of a predetermined number of times of repetitions of the production process. Alternatively, the resource allocation unit 21 may calculate estimated values of required times for the setup steps of the respective process steps for each of a predetermined number of times of repetitions of the production process in accordance with a predetermined optimization method, such as simulated annealing and a genetic algorithm. In this case, the resource allocation unit 21 may calculate estimated values of required times for the setup steps of the respective process steps in consideration of, for example, standard work times of the respective process steps, the number of workpiece bodies that are simultaneously worked on in each process step, times required to transport a workpiece body or a part among the respective zones (hereinafter, simply referred to as transport times), the number of workpiece bodies, parts, or trays that can be transported at a time, and supply intervals of parts and the like, which are stored in advance in the memory 13. Note that a transport time includes not only a time required for movement between the zones but also a time required for setup for transport (for example, a time required for transfer of a workpiece body between an AGV and a work place).

For example, in the production facilities 100 illustrated in FIG. 1, a plurality of AGVs 102 serve as resources that are used in the setup steps of the respective process steps. The respective AGVs 102 are, as described above, used for transport of a workpiece body between the zones A and D, transport of a workpiece body between the zones D and B, transport of a part c or a tray 101 between the zones A and B, transport of a workpiece body between the zones B and C, and transport of a workpiece body between the zones C and D.

Thus, the resource allocation unit 21 calculates required times for the setup steps of the respective process steps for each of a predetermined number of times of repetitions of the production process while changing in various ways combinations of AGVs 102 allocated to transport of workpiece bodies and the like among the respective zones. In so doing, the resource allocation unit 21 may, for example, allocate any ones of the plurality of AGVs 102 to transport of workpiece bodies, parts, or trays 101 between specific zones. Alternatively, the resource allocation unit 21 may allocate other one of the plurality of AGVs 102 in such a way that the AGV 102 transports workpiece bodies by moving among a plurality of zones in sequence along the movement sequence of the workpiece bodies. The resource allocation unit 21 may arrange, as an initial arrangement, each AGV 102 to any position on a transport route to which the AGV 102 is allocated and start calculating estimated values of required times for the setup steps of the respective process steps.

In the calculation of estimated values of required times for the setup steps of the respective process steps, the resource allocation unit 21 assumes that, for example, every time a standard work time of a first process step elapses or every time a part feeding interval in a zone in which the first process step is performed elapses, a new production process is started. Further, the resource allocation unit 21, assuming that, with respect to each process step, when, upon completion of the main work of the process step, any of the AGVs 102 is present in a zone in which the work of the process step is performed, transport is immediately performed, determines a transport time between corresponding zones as an estimated value of the required times for the setup step of a process step immediately after the process step and assumes that the AGV 102 moves to a transport destination zone. On the other hand, when, upon completion of the main work of the process step, no AGV 102 is present in the zone in which the work of the process step is performed, the resource allocation unit 21 sets a value calculated by adding a waiting time from the completion of the main work until any of the AGVs 102 returns to the zone to a transport time between corresponding zones as an estimated value of a required time for the setup step of a process step immediately after the process step. Therefore, the longer become times for which workpiece bodies to be transported have been waiting without being able to be transported, the longer estimated values of required times for the setup steps of the respective process steps become. In addition, regarding a process step in which a part other than a workpiece body is necessary for main work, a waiting time from arrival of a workpiece body at a zone where the work of the process step is performed to arrival of all parts necessary for the main work at the zone may also be added to an estimated value of a required time. Further, the resource allocation unit 21 assumes that an AGV 102 which is used for transport between specific zones, automatically returns after transporting a workpiece body or a part from a zone where work of a preceding process step is performed to a zone where work of a succeeding process step is performed, to the zone where the work of the preceding process step is performed. In addition, the resource allocation unit 21 may assume that an emptied tray 101 is also transported to the zone where the work of the preceding process step is performed. Further, the resource allocation unit 21 may assume that an AGV 102 which moves among a plurality of zones along the movement sequence of a workpiece body, waits, after transporting a workpiece body to any of the zones, in the zone until completion of the work of the process step in the zone. Further, when an AGV 102 is capable of transporting a plurality of workpiece bodies or parts simultaneously, the resource allocation unit 21 may assume that, when as many workpiece bodies or parts as the AGV 102 is capable of transporting are ready to be transported, the AGV 102 starts transport.

The resource allocation unit 21 sets an allocation of resources to the setup steps of the respective process steps when an average value of the totals of estimated values of required times for the setup steps of the respective process steps included in the production process has the minimum value as an allocation of resources that is applied to the production process. The resource allocation unit 21 notifies the schedule determination unit 22 of resources to be allocated to the setup steps of the respective process steps and estimated values of required times for the setup steps of the respective process steps in each of a predetermined number of times of repetitions of the production process when the average of the totals of estimated values of required times for the setup steps of the respective process steps included in the production process has the minimum value.

The schedule determination unit 22 sets, with respect to each process step, a value obtained by adding a predetermined margin to an average value of estimated values of the required time for the setup step of the process step over a predetermined number of times of repetitions of the production process or the maximum value among the estimated values of the required time when the average value of the totals of estimated values of required times for the setup steps has the minimum value as a standard required time for the setup step of the process step. Therefore, with respect to each process step, a standard required time for the setup step of the process step can be appropriately set.

Further, the schedule determination unit 22 plans a production schedule, assuming that, with respect to each process step included in the production process, after a standard required time for the setup step has elapsed, the main work of the process step is performed only for a standard work time of the process step. Note that the production schedule includes information representing resources allocated to the setup steps of the respective process steps. The schedule determination unit 22 stores the planned production schedule in the memory 13. In addition, the schedule determination unit 22 may display the planned production schedule on the user interface 11.

The facility control unit 23 outputs control signals to the respective facilities via the communication interface 12 in such a way that, when the production facilities are actually operated, respective pieces of equipment included in the production facilities operate in accordance with a planned production schedule. For example, the facility control unit 23 outputs, with respect to each process step in the production process, a command instructing transport of a workpiece body etc., from a zone where the work of the previous process step is performed to a zone where the work of the process step is performed to a control apparatus of a resource, such as an AGV, allocated to the setup step of the process step, at the time of start of the setup step of the process step. In addition, when the facility control unit 23 receives notification that the transport is completed from the control apparatus of the resource, the facility control unit 23 outputs a command instructing return to the zone where the work of the previous process step is performed to the control apparatus of the resource. Further, the facility control unit 23 outputs, with respect to each process step in the production process, a command instructing the main work to be performed to a control apparatus of a robot or a machine tool that is used in the main work of the process step, at the time of start of the main work of the process step.

Note that, when another device controls the control apparatuses of the respective facilities in accordance with a planned production schedule or an administrator controls the respective facilities in such a way that the respective facilities operate in accordance with the planned production schedule, the facility control unit 23 may be omitted.

FIG. 5 is an operation flowchart of production planning processing. The processor 14 executes the production planning processing in accordance with the following operation flowchart.

The resource allocation unit 21 of the processor 14 calculates, with reference to the number of resources and the like stored in the memory 13, a total of estimated values of required times for setup steps of respective process steps with respect to each performance of a production process when it is assumed that the entire production process is performed for a predetermined number of times, and calculates an average value of the totals of estimated values of required times, while an allocation combination of resources to the setup steps of the respective process steps included in the production process is changed into various combinations (step S101). The resource allocation unit 21 sets an allocation of resources to the setup steps of the respective process steps when an average value of the totals of estimated values of required times for the setup steps of the respective process steps included in the production process has the minimum value as an allocation of resources that is applied to the production process (step S102).

Further, the schedule determination unit 22 of the processor 14 sets, with respect to each process step, a value obtained by adding a predetermined margin to an average value of estimated values of the required time for the setup step of the process step over the predetermined number of times of repetitions of the production process or the maximum value among the estimated values of the required time when the average value of the totals of estimated values of required times for the setup steps has the minimum value as a standard required time for the setup step of the process step (step S103). The schedule determination unit 22 plans a production schedule, assuming that, with respect to each process step included in the production process, after a standard required time for the setup step has elapsed, the main work of the process step is performed only for a standard work time of the process step (step S104). The processor 14 terminates the production planning processing.

As described in the foregoing, the production planning apparatus sets, on the basis of the number of resources and the like available for setup steps of respective process steps included in a production process, required times for the setup steps of the respective process steps in such a way that the total of required times for the setup steps of the respective process steps is minimized and determines resources allocated to the setup steps of the respective process steps. Therefore, the production planning apparatus is capable of optimizing resources allocated to the setup steps of the respective process steps and reducing waiting times for which work is unable to be performed in the respective process steps. As a result, the production planning apparatus can optimize a production schedule. In particular, the production planning apparatus determines an allocation of resources used for the setup steps of the respective process steps in consideration of transport times of workpiece bodies etc., among zones even when job-shop type production facilities are used, and therefore the production planning apparatus is capable of optimizing resources allocated to the setup steps of the respective process steps and optimizing a production schedule of a production process that uses the production facilities.

According to a variation, a plurality of types of resources for setup step may be used for setup steps of respective process steps. For example, transport of workpiece bodies among zones may be performed by not only an AGV as described above but also a worker. In other words, a worker is another example of a resource for setup step. In this case, transport times between zones may be set in advance with respect to each type of resources for setup step and with respect to each combination of a transport origin zone and a transport destination zone and stored in the memory 13. As with the above-described embodiment, the resource allocation unit 21 may use, for calculation of estimated values of required times for setup steps of respective process steps, transport times corresponding to the type of resources for setup steps to be used when calculating the total of estimated values of required times for the setup steps of the respective process steps with respect to each production process.

According to another variation, the processor 14 may plan a production schedule with respect to each of a plurality of combinations of the numbers and types of resources used for setup steps of respective process steps included in a production process in accordance with the above-described embodiment or its variation and store the planned production schedules in the memory 13. By doing so, the processor 14 can use an optimum production schedule depending on a situation even when, for example, trouble occurs to any of resources used for the setup steps of the respective process steps, such as when any of a plurality of AGVs used for transport of workpiece bodies, etc., among zones fails and when any of a plurality of workers is absent because of illness.

In addition, in the resources for setup step, resources other than resources for transport may be included. For example, a robot or a worker transferring a workpiece body or a part between a work place and an AGV may be included in the resources for setup step. In this case, in the memory 13, times required for AGVs to move between zones and times required for robots or workers to transfer workpiece bodies, etc., between work places and AGVs may be stored in place of the above-described transport times. The resource allocation unit 21 may calculate estimated values of required times for the setup steps of the respective process steps as described above while changing arrangement combinations of robots or workers to zones where work of the respective process steps is performed.

In addition, according to still another variation, the resource allocation unit 21 may optimize an arrangement of zones to which groups of process steps are disposed. In this case, for example, with respect to each group of process steps, candidate zones to which the group can be disposed may be set in advance and stored in the memory 13. The resource allocation unit 21 may, calculate a minimum value of the total of estimated values of required times for setup steps of respective process steps included in a production process while changing combinations of candidate zones to which the groups of process steps are disposed, as with the above-described embodiment or either of its variations. The resource allocation unit 21 may determine zones to which the groups of respective process steps are disposed, in accordance with a combination of candidate zones corresponding to the minimum value.

For example, in the production facilities 100 illustrated in FIG. 1, the zones B and C may be set as candidate zones to which the automated assembly step is disposed. Similarly, the zones B and C may be set as candidate zones to which the welding step is disposed. Note that a zone to which the manual assembly step is disposed may be fixed to the zone A, in which the part input port exists. Similarly, a zone to which the inspection step is disposed may be fixed to the zone D, to which the finished product discharge port is disposed. In this case, the resource allocation unit 21 calculates the minimum value among the totals of estimated values of required times for setup steps of respective process steps included in a production process with respect to allocation combinations of resources in the case where the automated assembly step is disposed to the zone B and the welding step is disposed to the zone C. Similarly, the resource allocation unit 21 calculates the minimum value among the totals of estimated values of required times for the setup steps of the respective process steps included in the production process with respect to allocation combinations of the resources in the case where the automated assembly step is disposed to the zone C and the welding step is disposed to the zone B. For example, if the minimum value of the totals of estimated values of required times for the setup steps of the respective process steps in the case where the automated assembly step is disposed to the zone C and the welding step is disposed to the zone B is smaller than the minimum value of the totals of estimated values of required times for the setup steps of the respective process steps in the case where the automated assembly step is disposed to the zone B and the welding step is disposed to the zone C, the resource allocation unit 21 determines to arrange the automated assembly step in the zone C and arrange the welding step in the zone B.

According to the variation, the resource allocation unit 21 is capable of optimizing a geographical arrangement of zones to which groups of respective process steps are disposed in such a way as to reduce the total of required times for setup steps of respective process steps in job-shop type production facilities.

All examples and conditional language recited herein are intended to have teaching purpose to aid the reader in understanding the concepts contributed by the inventor to the present invention and furthering the art, and are to be construed as being without limitation to such specifically recited examples and conditions nor does the organization of such examples in the specification related to showing of the superiority and inferiority of the invention. Although the embodiment of the present invention is described in detail, it is to be understood that various changes, substitutions, and modifications can be made hereto without departing from the spirit and scope of the invention.

What is claimed is:

1. A production planning apparatus, comprising:
    a memory configured to
        store, with respect to each of a plurality of process steps included in a production process for producing predetermined articles, a number and type of resources for setup step that are available for a setup step in which setup for performing work of the process step is performed, and
        store, for each of the plurality of process steps, a required time for the setup step of the process step for each type of the resources for setup step; and
    a processor configured to, on the basis of the stored number and type of the resources for setup step and the stored required time for the setup step of the process step for each type of the resources for setup step, determine, among the resources for setup step, resources that are allocated to the setup steps of respective ones of the plurality of process steps in such a way that a total of required times required for the setup steps of respective ones of the plurality of process steps is minimized.

2. The production planning apparatus according to claim 1, wherein
    the resources for setup step include at least one type of resources for transport that are used for transport of articles to be worked on between places where work of respective ones of two successive process steps among the plurality of process steps is performed,
    the memory is configured to store, with respect to each of the at least one type of resources for transport, information representing a transport time required for transport of an article to be worked on by the resource for transport between places where respective ones of two successive process steps among the plurality of process steps are performed, as the required time for the setup step of the process step for each type of the resources for setup step, and
    the processor is further configured to calculate, with respect to each of the plurality of process steps, the required time when any of the at least one type of resources for transport is used for the setup step of the process step, with reference to the stored transport time of the resource for transport.

3. The production planning apparatus according to claim 1, wherein
    the memory is further configured to store a plurality of candidates of a place where work of a first process step among the plurality of process steps is performed, and
    the processor is further configured to
        calculate, with respect to each of the plurality of candidates, a total of the required times when the first process step is performed at the candidate, and
        determine, among the plurality of candidates, a candidate that minimizes the total of the required times as a place where work of the first process step is performed.

4. The production planning apparatus according to claim 1, wherein
    the memory is further configured to store, with respect to each of the plurality of process steps, a standard work time required for work of the process step, and
    the processor is further configured to, on the basis of (i) the required times required for the setup steps of respective ones of the plurality of process steps when a total of the required times is minimized and (ii) the standard work times of respective ones of the plurality of process steps, determine a production schedule for producing the predetermined articles in accordance with the production process.

5. The production planning apparatus according to claim 4, further comprising:
    a communication circuit configured to communicate with a control apparatus of production facilities for producing the predetermined articles in accordance with the production process; wherein
    the processor is further configured to output, in accordance with the production schedule, with respect to each of the plurality of process steps, a control signal for performing the setup step of the process step to the control apparatus via the communication circuit.

6. The production planning apparatus according to claim 1, wherein
    the processor is further configured to
        plan a plurality of production schedules each with respect to one of a plurality of combinations of the numbers and types of resources for setup step of respective process steps included in the production process, and
        store the planned plurality of production schedules in the memory.

7. The production planning apparatus according to claim 1, wherein
    the processor is further configured to optimize an arrangement of zones to which groups of process steps are disposed and stored in the memory.

* * * * *